United States Patent
Rachitsky et al.

(10) Patent No.: US 10,083,405 B2
(45) Date of Patent: Sep. 25, 2018

(54) HOST STANDARDS FOR PROVIDING LISTINGS

(71) Applicant: Airbnb, Inc., San Francisco, CA (US)

(72) Inventors: Lenny Rachitsky, San Francisco, CA (US); Martin Anh Dung Nguyen, San Francisco, CA (US); Vaughn Quoss, San Francisco, CA (US); David Michael Holtz, San Francisco, CA (US); Daniel Nathan Hill, San Francisco, CA (US); James Allen Ostrowski, II, San Francisco, CA (US); Nelson Aurel Gauthier, Los Angeles, CA (US)

(73) Assignee: Airbnb, Inc., San Francisco, CA (US)

( * ) Notice: Subject to any disclaimer, the term of this patent is extended or adjusted under 35 U.S.C. 154(b) by 780 days.

(21) Appl. No.: 14/628,142

(22) Filed: Feb. 20, 2015

(65) Prior Publication Data
US 2016/0247093 A1    Aug. 25, 2016

(51) Int. Cl.
H04L 29/00    (2006.01)
G06Q 10/02    (2012.01)
H04L 12/26    (2006.01)
G06Q 10/06    (2012.01)

(52) U.S. Cl.
CPC ....... *G06Q 10/02* (2013.01); *G06Q 10/06398* (2013.01); *H04L 43/16* (2013.01)

(58) Field of Classification Search
CPC ..... G06Q 10/02; G06Q 30/0609; H04L 43/16
See application file for complete search history.

(56) References Cited

U.S. PATENT DOCUMENTS

| | | | | |
|---|---|---|---|---|
| 2004/0034591 A1* | 2/2004 | Waelbroeck | ....... | G06Q 30/0251 705/37 |
| 2008/0059329 A1* | 3/2008 | Luchene | ............ | G06Q 30/0603 705/26.35 |
| 2011/0213629 A1* | 9/2011 | Clark | ..................... | G06Q 10/02 705/5 |
| 2012/0290427 A1* | 11/2012 | Reed | ..................... | G06Q 50/01 705/26.2 |

(Continued)

OTHER PUBLICATIONS

Airbnb Help Center—What is response rate and how is it calculated?, https://www.airbnb.com/help/article/430/what-is-response-rate-and-how-is-it-calculated, Nov. 30, 2017.*
Airbnb Help Center—Why was my listing paused or suspended?, https://www.airbnb.com/help/article/1303/why-was-my-listing-paused-or-suspended, Nov. 30, 2017.*
PCT International Search Report and Written Opinion, PCT Application No. PCT/US2016/018854, dated Jul. 7, 2016, 11 pages.

(Continued)

*Primary Examiner* — Daniel Vetter
(74) *Attorney, Agent, or Firm* — Fenwick & West LLP

(57) ABSTRACT

Methods and systems for enforcing host standards in a reservation system. In one embodiment, a reservation system provides two methods of communication between a potential guest and a host, hard communications and soft communications. The reservation system associates both types of communication with threads, each thread associated with the host and an associated reservation. The reservation system determines suspension metrics for each host based on the communications of the threads they are associated with. When the suspension metrics associated with a host satisfy one or more suspension criteria, the reservation system issues a suspension to the host.

20 Claims, 14 Drawing Sheets

(56) References Cited

U.S. PATENT DOCUMENTS

| | | | | |
|---|---|---|---|---|
| 2012/0290652 A1* | 11/2012 | Boskovic | ............... | G06Q 10/02 709/204 |
| 2014/0100900 A1* | 4/2014 | Abhyanker | ............ | G06Q 10/02 705/5 |
| 2014/0278591 A1* | 9/2014 | Blecharczyk | .......... | G06Q 10/02 705/5 |
| 2015/0154687 A1* | 6/2015 | Bellora | ............... | G06Q 30/0637 705/26.82 |
| 2015/0193864 A1* | 7/2015 | Allison | ................. | G06Q 10/02 705/5 |
| 2016/0098649 A1* | 4/2016 | Ifrach | ..................... | G06F 17/18 705/5 |

OTHER PUBLICATIONS

Various: "Client-Server Model—Wikipedia, the Free Encyclopedia," Jan. 20, 2015, Wikipedia.org, 5 pages, [Online] [Retrieved on Jun. 9, 2016] Retrieved from the Internet<URL:https://en.wikipedia.org/w/index.php?title-Client-server_model&oldid=643399697>.

Various: "Conversation Threading—Wkipedia, the Free Encyclopedia," Feb. 15, 2015, Wikipedia.org, 3 pages, [Online] [Retrieved on Jun. 9, 2016] Retrieved from the Internet<URL:https://en.wikipedia.org/w/index.php?title=Conversation_threading&oldid=647190783>.

"Airbnb Policies," Oct. 14, 2012, Airbnb, Inc., 7 pages. [Online] [Retrieved on Apr. 5, 2018] Retrieved from the Internet <URL:https//https://web.archive.org/web/20121014155245/https://www.airbnb.com/policies#expand.>.

\* cited by examiner

FIG. 6A – Hard Communication
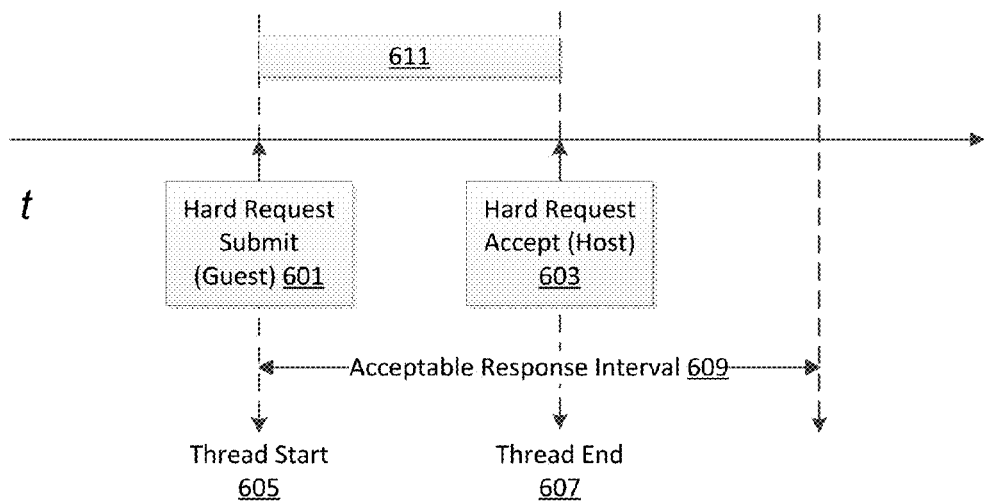
FIG. 6B – Soft Communication
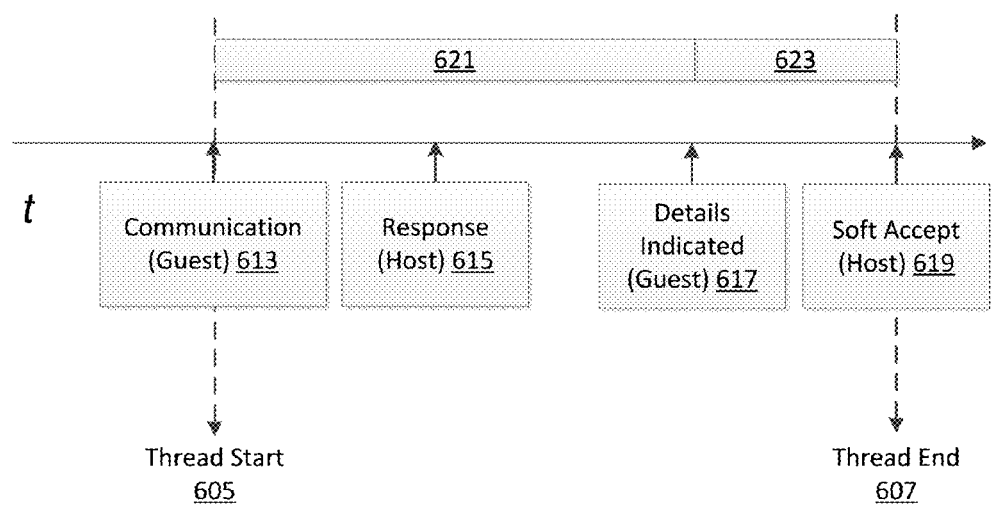

FIG. 6C – Hard to Soft Communication
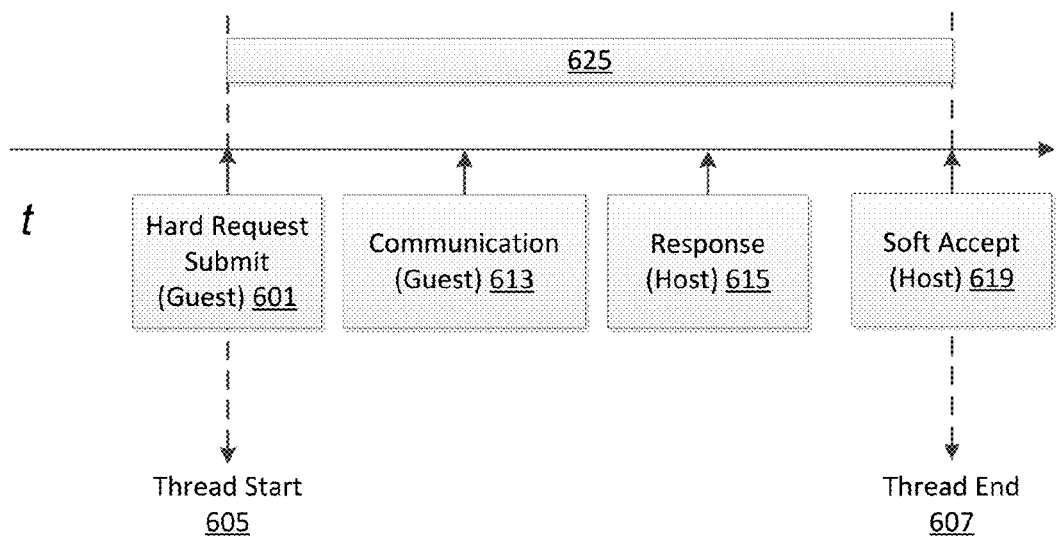
FIG. 6D – Soft to Hard Communication
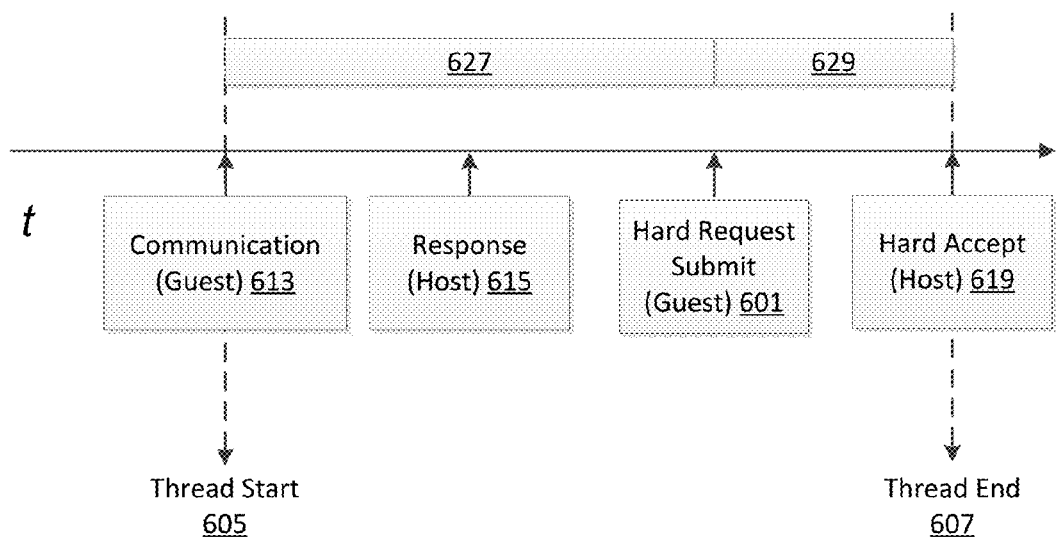

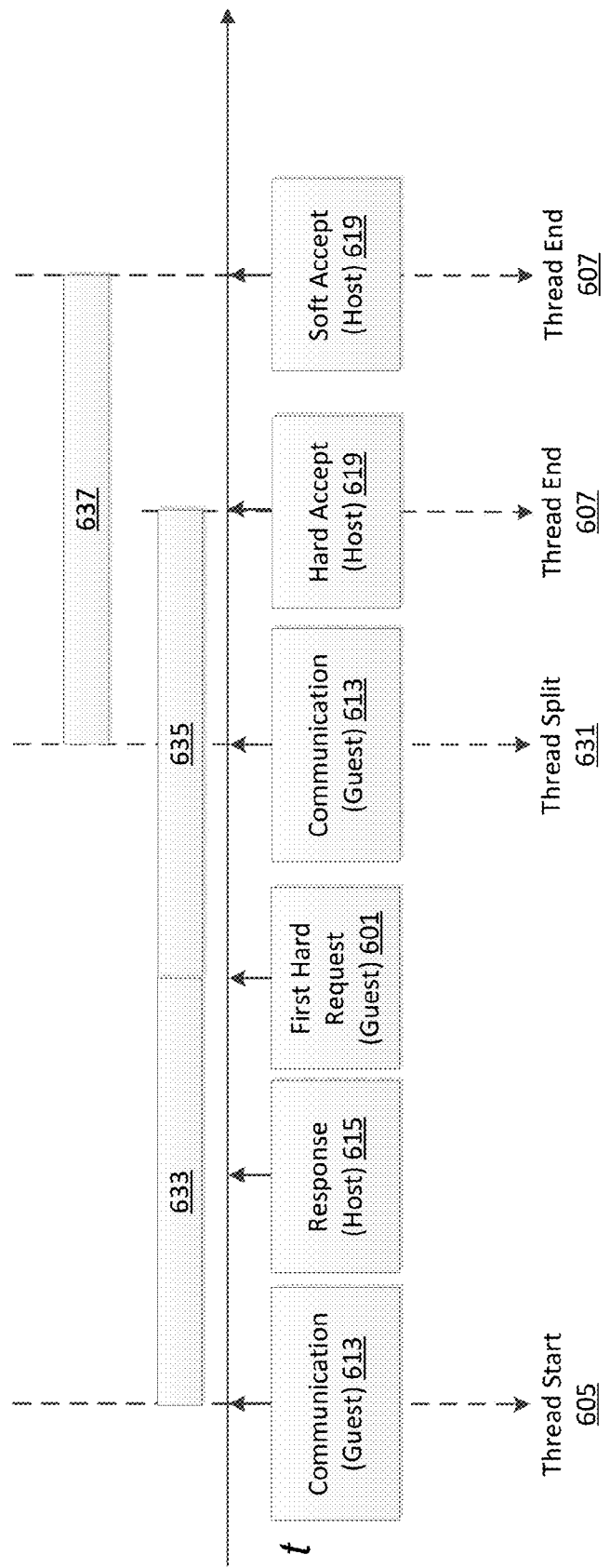
FIG. 6E – Thread Splitting

FIG. 7A – Denial Within Acceptable Response Interval
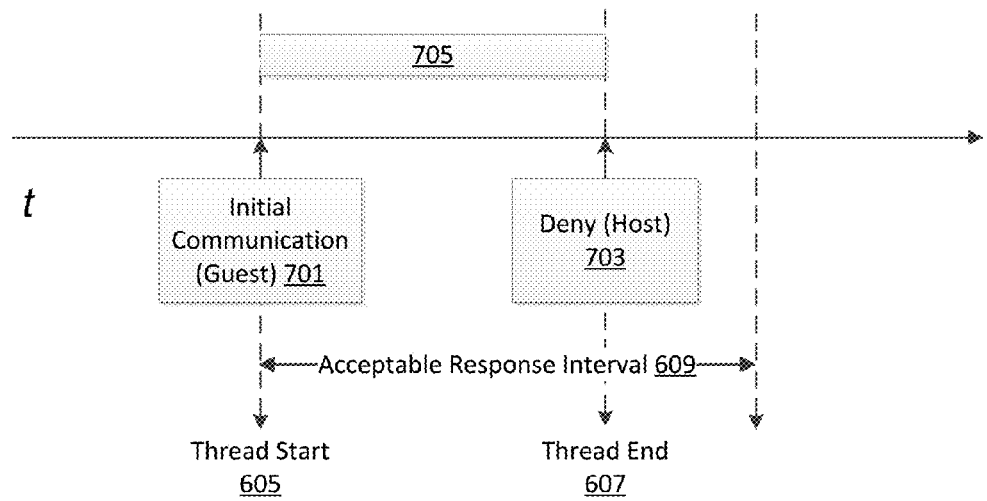
FIG. 7B – Response Outside of Acceptable Response Interval
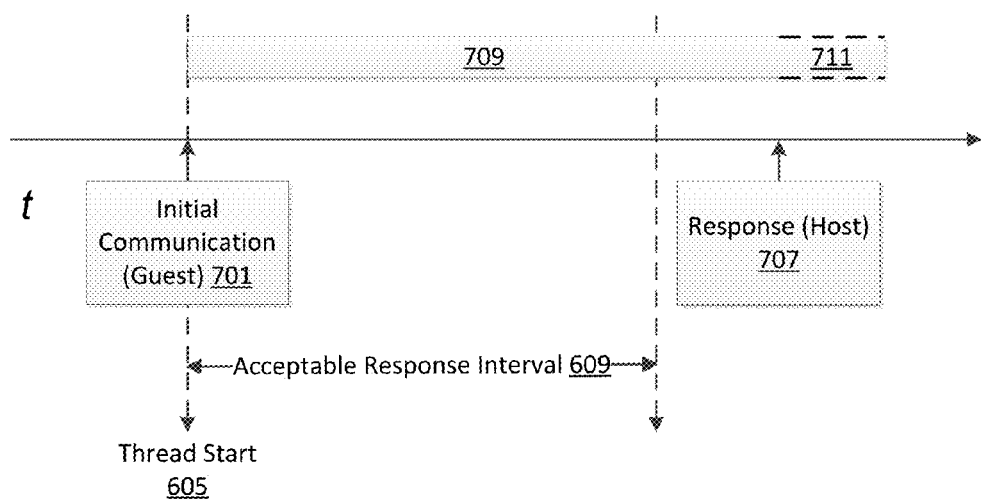

FIG. 7C – No Response
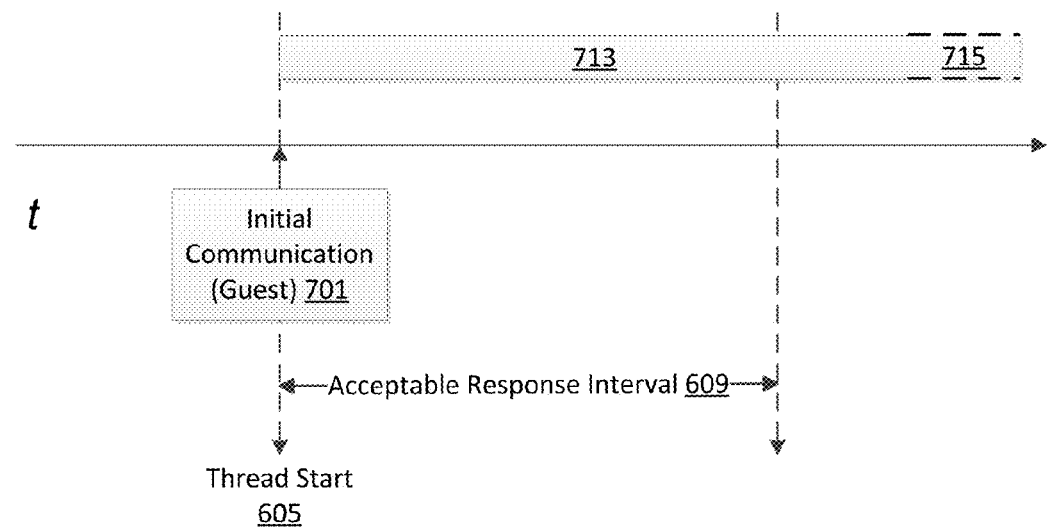

FIG. 8A – Guest Books Before Host Response Within Interval
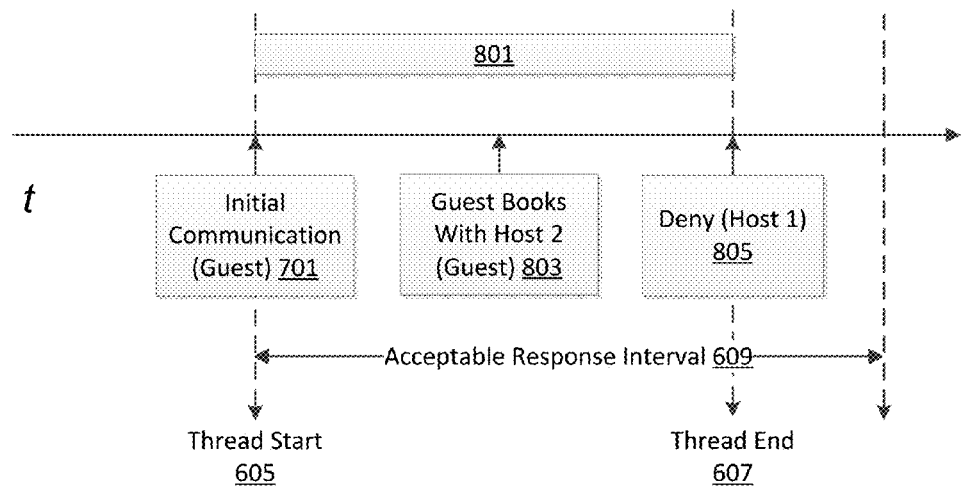
FIG. 8B – Guest Books Before Host Response Outside Interval
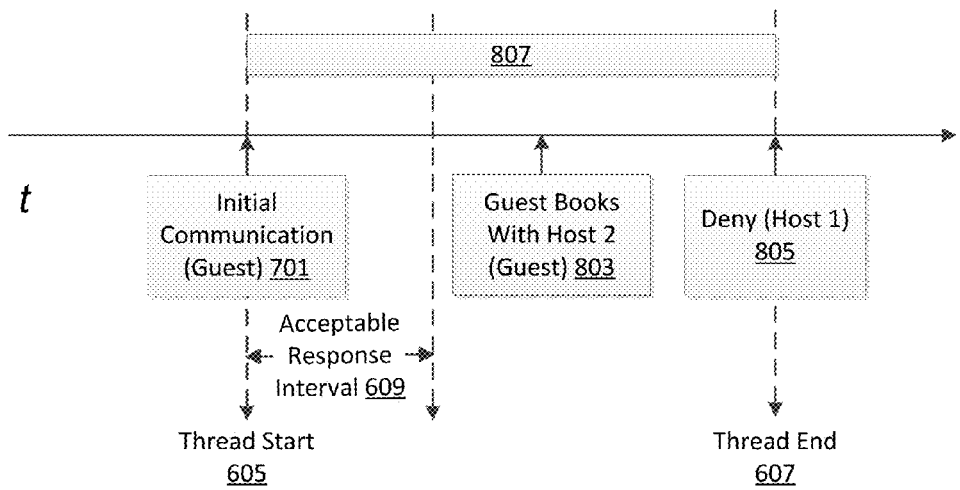

FIG. 8C – Guest Books Before Host Response Within Interval But
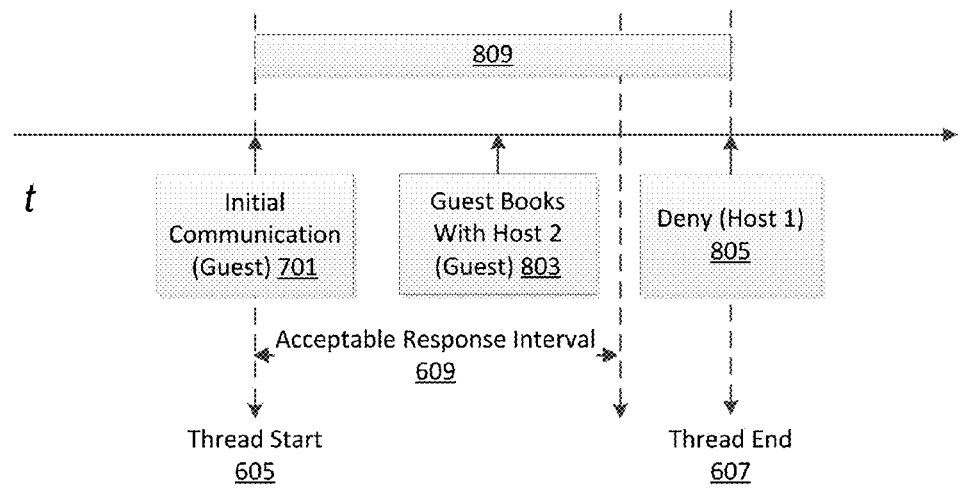
FIG. 8D – Guest Books After Host Denial
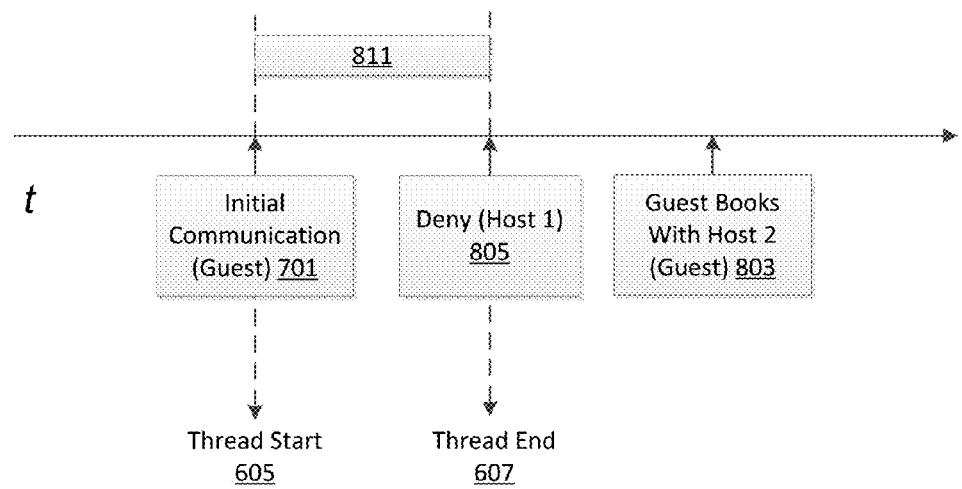

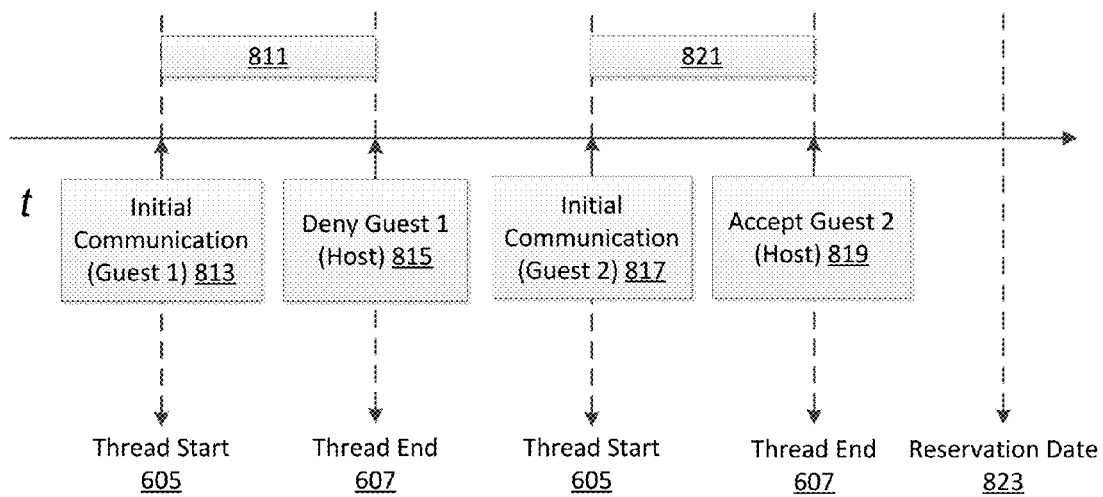
FIG. 9 – Host Books a Different Guest For The Same Reservation Date

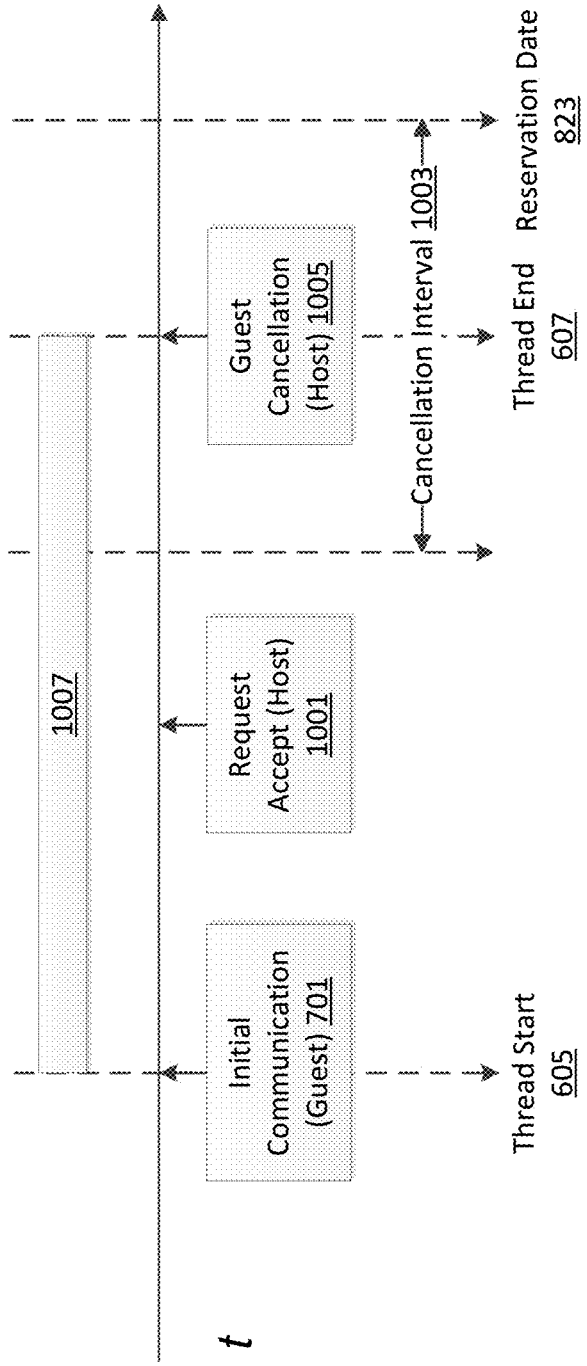
FIG. 10 – Guest Cancels Within Cancellation Interval

HOST STANDARDS FOR PROVIDING LISTINGS

TECHNICAL FIELD

This invention relates to reservation systems and particularly to determining standards for host eligibility to access to a reservation system based on host behavior in response to requests from potential guests.

BACKGROUND

Many online computer systems offer listings of goods and services for sale, rent, and reservation (for simplicity, "booking" generally) that have or are associated with real world locations that have intangible value to the prospective consumer. Online accommodations and reservations systems (referred to herein as reservation systems) provide a suitable example. Reservation systems match potential guests looking for short term accommodation with hosts offering different and varied accommodations. Because the hosts are separate entities not under direct control by the reservation system, providing a standardized level of service for potential guests is difficult as each host may not consistently act at a level that is deemed satisfactory by potential guests and/or the provider of the reservation system. This difficulty is compounded by the difficulty in detecting poor host service absent specific complaints by guests, as well as quantifying the quality of host service given that satisfactory host behavior can be highly subjective depending upon the guest.

SUMMARY

An online reservation system provides potential guests with the ability to request to reserve a listing from any host with listings available on the reservation system. The reservation system records all communications between each potential guest and host pair. These communications are parsed and organized into threads, where each thread is associated with a listing, as well as a particular line of inquiry regarding a potential reservation of a host's listing by the guest. The reservation system uses the threads associated with each host as a basis for calculating summary statistics for each host, herein referred to as suspension metrics. Suspension metrics represent quantification of a host's actions that represent undesirable service to guests of the reservation system. For instance, a suspension metric for a host may be the average response time of the host. Furthermore, an average response time of greater than 18 hours might be correlated with a greater likelihood of poor guest satisfaction, which, in turn, could result in the guest declining to book with the host. The reservation system may use the suspension metrics to help curb poor host behavior in an effort to improve booking rates and guest satisfaction. For example, a suspension criterion may be created where a host is suspended when their average response time exceeds a threshold of 18 hours. In other embodiments, suspension may instead occur only after the host violates several different suspension criteria associated with different suspension metrics.

The reservation system must perform some processing to associate communications with listings and threads, as thread identification is not a discrete, intrinsic property of a given communication. The reservation system uses information contained in communications to make this association. More specifically, the reservation system includes two modes of communication between potential guests and a host. Hard communications include both standardized reservation request forms that can be sent by the potential guest as well as corresponding acceptances or denials of the same request forms by the host. The standardized forms include all details necessary to allow acceptance of the offer presented by the request form to be binding without further addition or modification by the host or guest. Due to the abundance of detail in hard communications, the reservation system is conveniently able to parse the hard communications to create or associate the hard communication with a thread. On the other hand, soft communications are messages that may contain as little as a timestamp and text message body. These messages may be textual inquiries about particular listings, generic questions about a listing, or any other message. By virtue of the flexibility of their content, associating soft communications with threads is more difficult than for hard communications. The reservation system is configured to parse soft communications and associate soft communications with threads based on the message content and any other contextual information that may be available. It is often the case that guests communicate with hosts about a listing using both types of communications and so hard and soft communications may occur in the same thread.

Other examples of suspension metrics include acceptance rate, response rate, average response time, and consecutive non-responses. Many of these are related in that they deal with the host's treatment of the guest, either in terms of responsiveness, or willingness to allow for reservation or otherwise provide service to potential guests. If the host's behavior is going to be quantified based on their responsiveness to the guest, then accurate knowledge of which guest and host communications are related is important. Threads achieve this accuracy, thus preventing accidental mischaracterization of host behavior. For example, the acceptance rate suspension metric, which measures the frequency with which a host successfully books their listings, can be calculated more easily using a thread. All communications relating to a listing can be tracked, and accumulated as a thread, and the acceptance or denial of a guests inquiry can be evaluated based on the communications. Because both hard and soft communications are combined together in a thread, the outcome of an exchange between a guest and a host can be determined over multiple forms of communication about single listing.

However, threads may also include information about exceptions that may be applicable for particular host behaviors. For example, if two different guests request a host's listed accommodation during the same period of time, the host may deny one guest in favor of another. Denying one guest in favor of another guest may be deemed an acceptable host behavior and so such a denial may not be included in a suspension metric like an acceptance rate. To create an exception for this case, the outcome of the reservation associated with the denied guest's thread must be known so that the denial does not count toward the host's acceptance rate. By checking the calendar associated with a host, the reservation system can determine that the requested reservation time of the denied guest was eventually booked.

Once the reservation system determines that a host should be suspended based on the suspension metrics and suspension criteria, the reservation system may carry out that suspension, as well as provide information to the suspended host about the reason for their suspension. Separate suspension metrics may also be calculated using only hard communications, and/or only soft communications. Further, suspensions of various severities may be issued based on one or multiple metrics that are in turn based on threads that may contain one or both of hard and soft communications.

BRIEF DESCRIPTION OF THE DRAWINGS

FIG. 6A is a timeline representing a thread composed of hard communications in accordance with one embodiment.

FIG. 6B is a timeline representing a thread composed of soft communications in accordance with one embodiment.

FIG. 6C is a timeline representing a thread composed hard and soft communications beginning with a hard communication in accordance with one embodiment.

FIG. 6D is a timeline representing a thread composed of hard and soft communications beginning with a soft communication in accordance with one embodiment.

FIG. 6E is a timeline representing multiple threads resulting from a series of communications between a potential guest and the host in accordance with one embodiment.

FIG. 7A is a timeline representing a thread that results in a denial by the host in accordance with one embodiment.

FIG. 7B is a timeline representing a thread that results in a denial and a non-response by the host in accordance with one embodiment.

FIG. 7C is a timeline representing a thread that results in a non-response by the host in accordance with one embodiment.

FIG. 8A is a timeline representing a thread that results in a guest booking exception in accordance with one embodiment.

FIG. 8B is a timeline representing a thread that results in a host non-response and does not result with a guest booking exception in accordance with one embodiment.

FIG. 8C is a timeline representing a thread that results in a host non-response and a guest booking exception in accordance with one embodiment.

FIG. 8D is a timeline representing a thread that results in host denial but not a host non-response in accordance with one embodiment.

FIG. 9 is a timeline representing a thread that represents a host denying one guest in favor of another in accordance with one embodiment.

FIG. 10 is a timeline representing a thread that results in a guest cancellation exception in accordance with one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
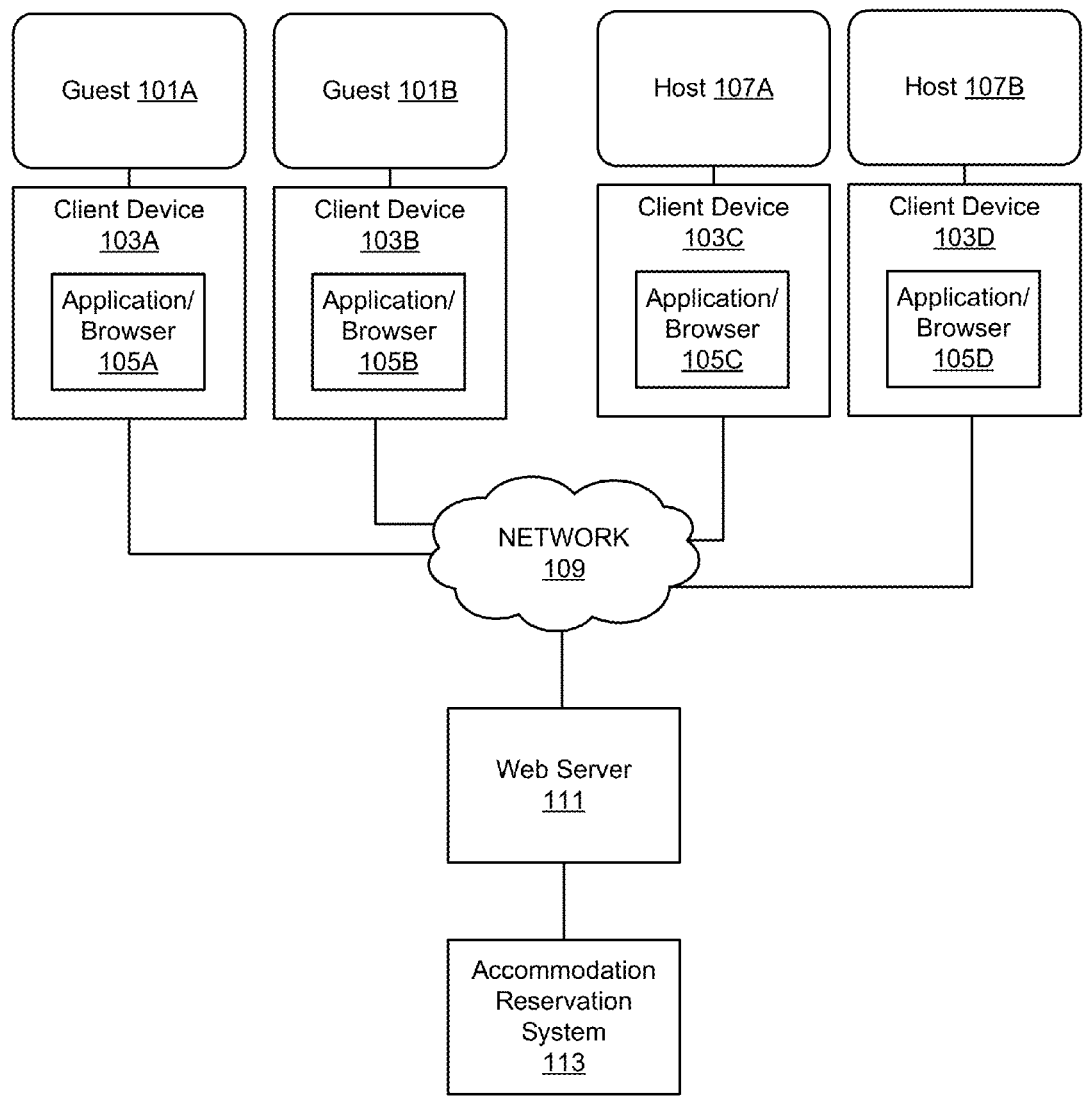
FIG. 1 is a block diagram of a computing environment including a reservation system in accordance with one embodiment.

FIG. 1 is a block diagram of a computing environment including a reservation system in accordance with one embodiment. The network 109 represents the communication pathways between potential guests 101, those people wishing to reserve a listing, and hosts 107, those providing the listing, and the web server 111 configured to implement the reservation system 113. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 103 are used by the guests 101 and hosts 107 for interacting with the reservation system 113. A client device 103 can be any device that is or incorporates a computer such as a personal computer (PC), a desktop computer, a laptop computer, a notebook, a smartphone, or the like. A computer is a device having one or more general or special purpose processors, memory, storage, and networking components (either wired or wireless). The client device 103 executes an operating system, for example, a Microsoft Windows-compatible operating system (OS), Apple OS X or iOS, a Linux distribution, or Google's Android OS. In some embodiments, the client device 103 may use a web browser 105, such as Microsoft Internet Explorer, Mozilla Firefox, Google Chrome, Apple Safari and/or Opera, as an interface to interact with the reservation system 113. In other embodiments, the client device 103 may execute a dedicated application for accessing the reservation system 113.

The reservation system 113 includes web server 111 that provides web pages or other web content that form the basic graphical user interface visible to the guests 101 and a different graphical user interface visible to hosts 107 to manage their listings. Guests 101 and hosts 107 use respective client devices 103 to access one or more web pages, and interact with the reservation system 113 via the interface.

The reservation system 113 may be, for example, a dining reservation system, a rideshare reservation system, an accommodation reservation, and the like. More generally, the reservation system 113 provides guests 101 with ability to request to reserve listings provided by hosts 107. The real world, physical location of each listed accommodation or service is often considered as a factor in the guest's decision to reserve the provided listing. Other example factors include the listing type, the identity of the host 107 providing the listing, and reviews written by guests who have previously reserved the listing offered by the host 107.

The reservation system 113 facilitates transactions between guests 101 and hosts 107. For example, an accommodation reservation system allows guests 101 to book (reserve) accommodations provided by hosts 107 of the reservation system. A rideshare reservation system allows users 103 to book rides from one location to another, and so on. The reservation system 113 comprises additional components and modules that are described below.

The reservation system 113 may also provide, via the graphical user interface, two separate modes of communication between potential guests and a host: hard communications and soft communications. Hard communications include standardized reservation request forms that can be sent by the potential guest 101, as well as corresponding responses by the host either accepting or denying a received request form. Hard communications also include responses by the host proposing a modification to a received reservation request, for example changing the date, price, or arrival time of a reservation, The standardized forms may require the guest 101 to record their reservation check-in date, reservation duration (or check-out date), number of guests, or any other details that must be included for an acceptance to be binding without further communication. On the other hand, soft communications are messages that may be sent between a potential guest and a host comprised of the message content and a timestamp. These messages may be textual inquiries about particular listings, generic questions about a listing, or any other message. Soft communications are not necessarily associated with a reservation time by default, as is the case with hard communications, though typically the listing is known. Soft communications may include any item of information that is also present in a hard communications, as they may contain whatever content the communicating user adds. However, they do not necessarily have specific content by default as a hard communication does. It is common for guests and hosts to use both types of communication to communicate with each other about a listing, responding to hard communication with a soft communication or vice versa.

II. Reservation System

Figure 2:
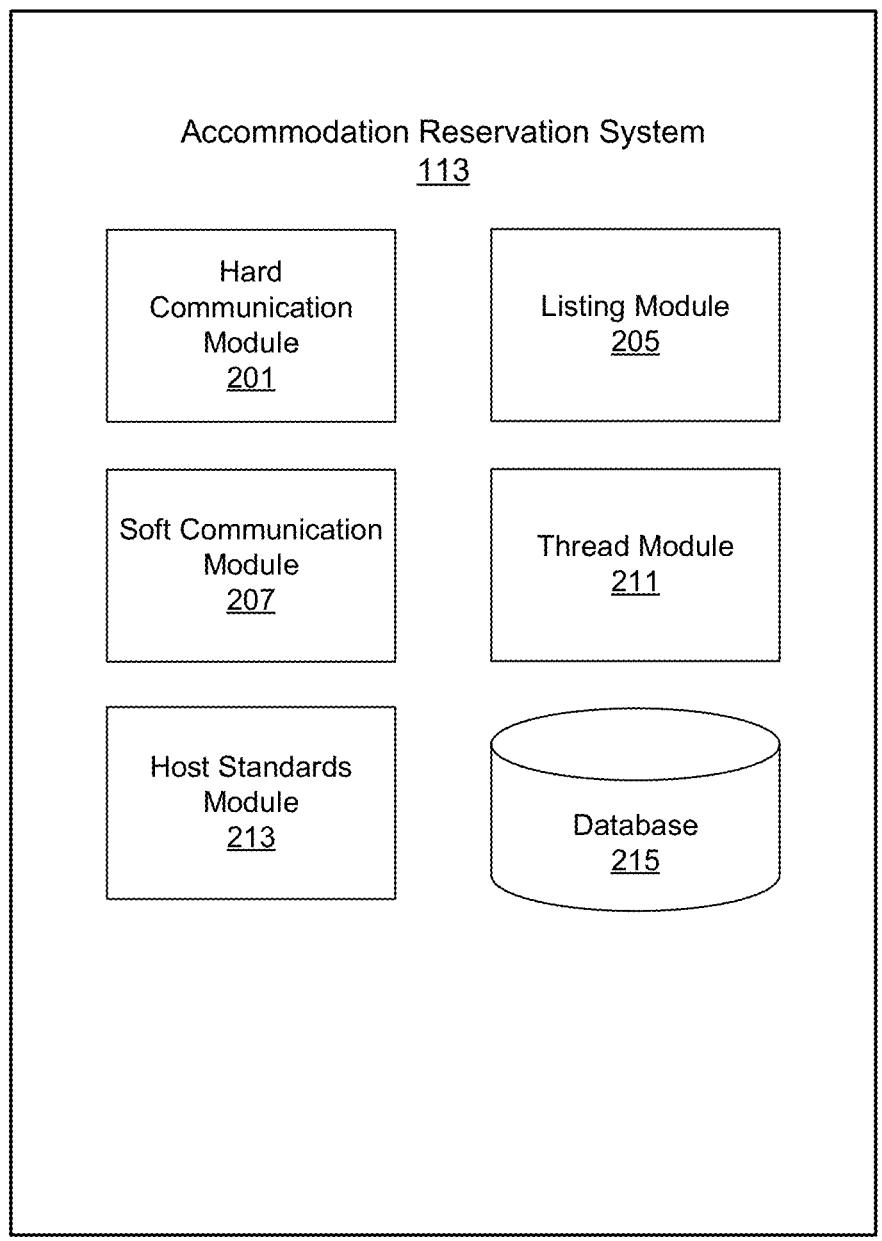
FIG. 2 is a block diagram of the logical components of the reservation system in accordance with one embodiment.

FIG. 2 is a block diagram of the logical components of the reservation system, in accordance with one embodiment. The reservation system 113 comprises a hard communication module 201, a listing module 205, a soft communication module 207, a thread module 211, a host standards module 213, and a database 215. Each of the aforementioned modules is described in a following section pertaining to its function in the reservation system 113. Those of skill in the art will appreciate that the reservation system 113 may also contain different and other modules that are not described herein. In addition, conventional elements, such as firewalls, authentication systems, payment processing systems, network management tools, load balancers, and so forth are not shown as they are not material to the invention.

The reservation system 113 may be implemented using a single computer, or a network of computers, including cloud-based computer implementations. The computers are preferably server class computers including one or more high-performance CPUs and 1G or more of main memory, and running an operating system such as LINUX or variants thereof. The operations of the system 113 as described herein can be controlled through either hardware or through computer programs installed in non-transitory computer storage and executed by the processors to perform the functions described herein. The database 215 is implemented using non-transitory computer readable storage devices, and suitable database management systems for data access and retrieval. The system 113 includes other hardware elements necessary for the operations described here, including network interfaces and protocols, input devices for data entry, and output devices for display, printing, or other presentations of data. Additionally, the operations listed here are necessarily performed at such a frequency and over such a large set of data that they must be performed by a computer in order to be performed in a commercially useful amount of time, and thus cannot be performed at this volume by the human mind.

Figure 3:
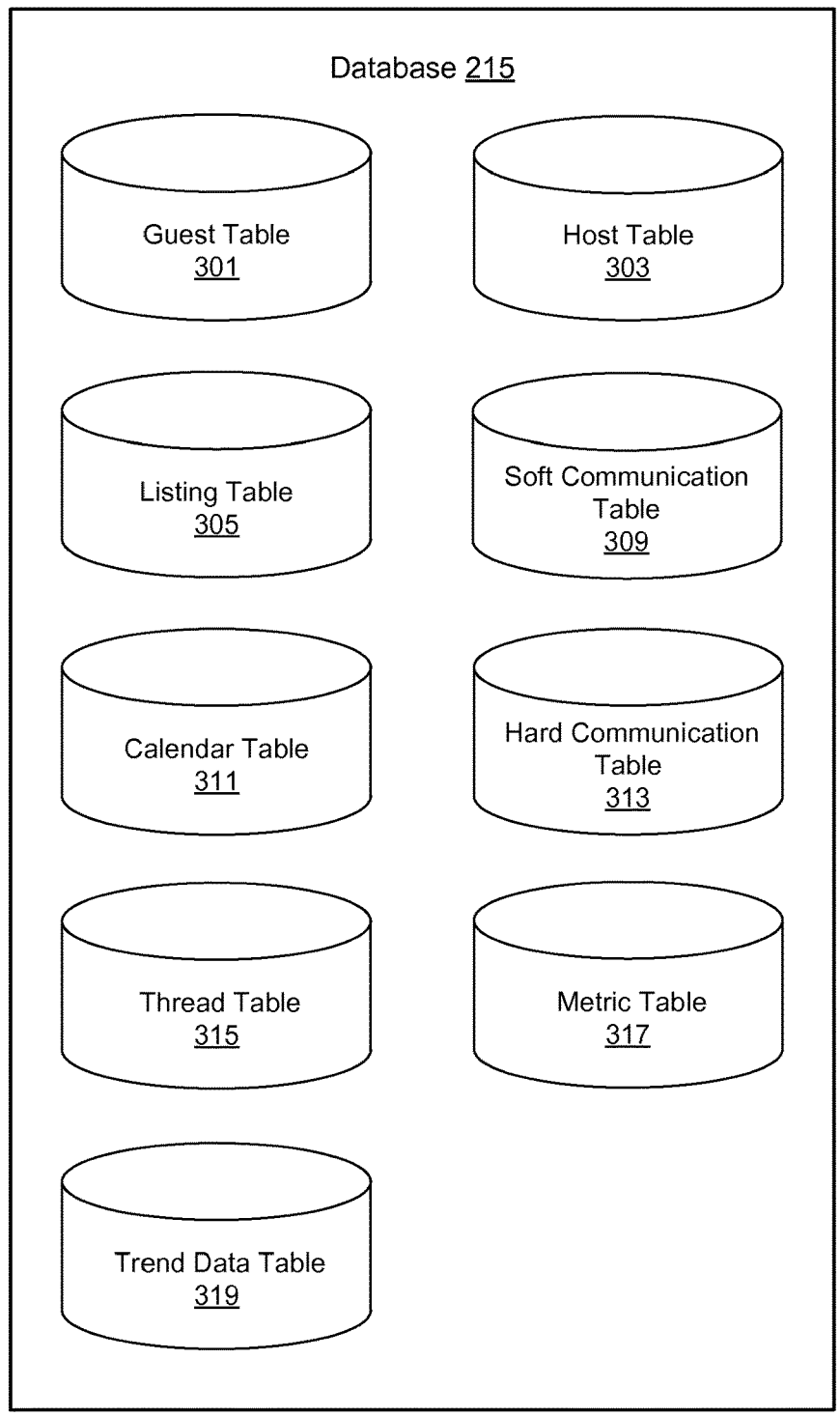
FIG. 3 is a block diagram illustrating example tables within an example database associated with the reservation system in accordance with one embodiment.

FIG. 3 is a block diagram illustrating example tables within an example database associated with the reservation system 113 in accordance with one embodiment. In one embodiment the database 215 comprises a guest table 301, a host table 303, a listing table 305, a soft communication table 309, a calendar table 311, a hard communication table 313, a thread table 315, a metric table 317, and a trend data table 319. Each of the aforementioned tables is described in a following section pertaining to its usage by the reservation system 113. Those of skill in the art will appreciate that the database 215 may contain other tables that are not described herein. The database may be implemented using any suitable database management system such as MySQL, PostgreSQL, Microsoft SQL Server, Oracle, SAP, IBM DB2, or the like.

III. Data Model

Figure 4:
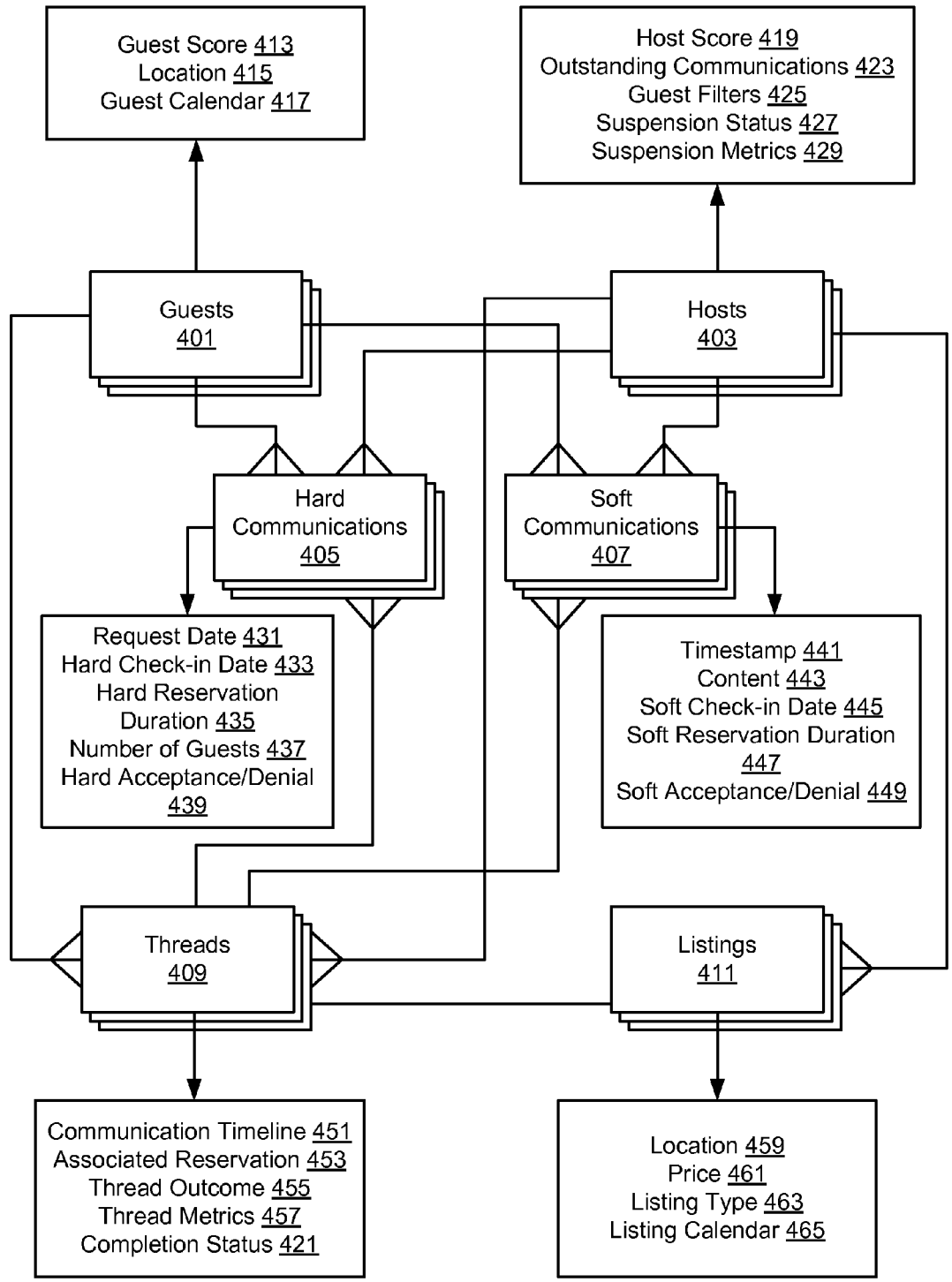
FIG. 4 is a block diagram of an example data model for use with the reservation system in accordance with one embodiment.

FIG. 4 is an illustration of an example object-oriented class diagram of class objects that may be used to implement the reservation system 113 according to one embodiment. The objects include guest objects 401, host objects 403, hard communication objects 405, soft communication objects 407, thread objects 409, and listing objects 411. The lines in between the boxes representing each object represent the relationships between each object. In the interest of brevity, guest objects 401 may be referred to simply as guests 401 (as opposed to guests 101), host objects 403 may be referred to as hosts 403 (as opposed to hosts 107), and so forth. Each of the aforementioned objects is described in a following section pertaining to its usage by the reservation system 113. The objects of FIG. 4 may also be interpreted as examples of data structures (e.g., a data model) that may be implemented in the reservation system 113 and database 215 in order to store the data of the reservation system 113.

III.A Guests in a Reservation System

Each guest 101 is represented in the reservation system 113 by an individual guest object (sometimes referred to as a guest profile) 401 having a unique guest ID stored in guest table 301. The guest object may be comprised of a number of guest related attribute fields including a profile picture or other identifying information, a guest score 413, a location 415, and a guest calendar 417. The reservation system 113 allows each guest 101 to communicate with multiple hosts. Between any given host 101 and guest pair 107, multiple hard 405 or soft 407 communications may be exchanged.

The guest score 413 provides a numerical representation of the user's previous behavior as a guest. In some embodiments, the guest score 413 is based on the scores (e.g., ratings) assigned by hosts 107 from the guest's previous bookings. For example, if the guest 101 destroys the furniture provided with the accommodation the guest 101 might receive a poor rating from the host 107 providing the accommodation, which would in turn lower the guest score 413 of the guest 101. The guest location 415 is either a guest's 101 current physical location (e.g., based on information provided by their client device 103), or their home address, neighborhood, city, state, or country of residence. The guest location 415 that may be used to filter search criteria relevant to a particular guest 101 or assign default language preferences. The guest calendar 417 is an entry in the calendar table 315 corresponding to the dates that listings have been reserved by the guest 101. The guest calendar 417 is updated whenever the guest 101 makes a new listing reservation. The guest calendar 417 is accessed by either the guest 101 or the reservation system 113 to determine where the guest has stayed or will be staying.

III.B Hosts in a Reservation System

Each host 107 is assigned an individual host object (sometimes referred to as a host profile) 403, with a unique ID, which represents the host 107 in the reservation system 113. Host objects 409 are stored by the reservation system 113 in the host table 303. A host 107 may provide one or more listings 411 to the reservation system 113. The host object 403 is composed of a number of host attributes including host score 419, outstanding communications 423, guest filters 425, suspension status 427, and suspension metrics 429.

Outstanding communications 423 are a list of hard 403 or soft 405 communications to which the host 107 has not yet responded. This list is maintained by the thread module 211 so as to be able to notify the host of communications that need responses and is also used by the host standards module 213 to calculate particular suspension metrics 429. The thread module 211 is described further below in section III.F.

Guest filters 425 are settings configured by the host 107 that the reservation system 113 uses to prevent potential guests that might not be acceptable to the host from viewing the host's listings 411 in the reservation system's 113 search results and/or sending hard or soft communications to the host 107. For example, a host may want to avoid guests 101 that have a guest score 413 under a threshold value and so the host 107 might set a guest filter preventing guests under the threshold guest score value from viewing the host's listings 411. Additionally, the guest filters 425 may indicate the times at which the host 107 can be contacted by a potential guest, how far in advance the reservations must be booked, or any other preference of the host 107 that may require the exclusion of guests 101. With respect to host suspension metrics, these guest filters 425 allow hosts to better control their interactions with guests so that the host can better avoid being unduly penalized in suspension metric calculations for guest interactions they cannot or do not want to have to deal with. This improves the host experience with the reservation system 113 while also maintaining the guest experience in dealing with hosts.

The suspension status 427 of a host is a field within the host object 403 that allows the reservation system 113 to adjust or determine (i.e., read out) whether the host is currently suspended and what type of suspension is in effect, as well as the remaining duration of the suspension. The host standards module 213 may institute at least two types of suspensions, major and minor suspensions. Each type of suspension may enable different levels of punishment. For example, a major suspension may result in a host 107 not being able to post listings 411 to the reservation system 113 for 30 days while a minor suspension might only institute a probationary period for the host for 30 days.

The host standards module calculates suspension metrics 429 for each host object 403 in the reservation system 113 and may update the suspension metrics 429 periodically or continuously. The host standards module 213 parses threads 409 associated with the host 403 to calculate the same host's suspension metrics. Detailed descriptions of suspension metrics 429 and the operation of the host standards module 213 are included in section III.G.

The host score 419 provides a numerical representation of the user's previous behavior as a host. The host score 419 can be based on the rating assigned by guests from the host's previous bookings. Generally, a guest who books a listing from a host can provide a rating of the host as well as the listing itself. The ratings are then aggregated into a host score. The ratings can be weighted according to the guests' own scores 413, as well as decayed based on the age of the rating (i.e., how old the rating is). Additionally, the host score may be affected by suspension metrics 429. For example, if a guest 101 finds that a host 107 has not prepared the bed in an accommodation and that some of the listed amenities are not present then the guest 107 may rate the host 107 poorly contributing to a low host score 419.

A host can also be a guest. In this case the user will have a profile entry in both the guest table 301 and the host store 303. Embodiments of the reservation system 113 may combine the guest table 301 and the host table 303 into a single user profile store. The user profile store will then store the personal information as well as any guest related information and host related information if applicable. This scheme reduces the amount of redundant information between the guest store 301 and the host store 303 when a user utilizes the reservation system to both offer and reserve listings.

III.C Listings in a Reservation System

The listing module 205 receives an input query from a guest 101 and returns a list of listings that best match the input query, and is one means for performing this function. For example, for an accommodation reservation system the search query includes search parameters regarding the guest's trip, such as location (e.g., postal code, city name, and country), check in date, check out date, number of guests, and the like; and the guest's listing preferences, such as listing type (single bed, room, entire building), price range, amenities, and the like. The listing module 205 then retrieves all the listings that match the search query. In one embodiment, Boolean matching is used for parameters such as location and date, listing type and price range, with additional parameters used to further filter the results.

Listing objects 411 represent particular offers provided by hosts, e.g., individual rental or real estate properties offered by an accommodation system. Each listing object 411 is associated with the host providing the listing and is assigned a unique listing ID. A listing object is comprised of a location 459, price 461, listing type 463, and a listing calendar 465. The listing table 305 stores information about listings offered by hosts 107 and may contain additional information such as a short description of the listing, a list of rules, photographs, etc.

Location 459 identifies the geographic location of the listing, such as the complete address, neighborhood, city, and/or country of the offered listing. Price 461 is the amount of money a guest needs to pay in order to reserve the listing. The price 461 may be specified as an amount of money per day, per week, per day, per month, and/or per season, or other period of time specified by the host. Additionally, price 461 may include additional charges such as cleaning fee, pet fee, and service fees. Listing type 463 describes the type of listing being offered by the host. For example, in an accommodation reservation system a listing type 463 is classified by unit type into two groups, room type and property type. Types of room include entire home or apartment, private room, and shared room. Types of property include apartment, house, bed & breakfast, cabin, villa, castle, dorm, treehouse, boat, plane, parking space, car, van, camper or recreational vehicle, igloo, lighthouse, yurt, tipi, cave, island, chalet, earth house, hut, train, tent, loft, and the like.

The listing calendar 465 stores the availability of the listing for each date in a date period, as specified by the host or determined automatically (e.g., through a calendar import process). That is, a host accesses the listing calendar 465 for a listing, and manually indicates which dates that the listing is or is not available. The listing calendar 465 also includes information about the dates that the listing is unavailable if it has already been booked by a guest. In addition, the listing calendar 465 continues to store historical information as to the availability of the listing. Further, the listing calendar 465 may include calendar rules, e.g., the minimum and maximum number of nights allowed. Information from each listing calendar 465 is stored in the calendar table 311, which stores information indicating the availability of every listing. Each host 107 is responsible for updating the listing calendar 465 for every listing 411 they post in the reservation system 113. This information is used to form the calendar table 311.

III.D Hard Communication Module

The hard communication module 201 allows guests 101 to submit contractual offers to reserve a listing for a period of time, and is one means for performing this function. In operation, the hard communication module 201 receives a hard communication request from a guest 101 to reserve a listing offered by a particular host 107. The contents of a hard reservation request form were introduced above in section I. The hard communication module 201 receives the filled out form from the guest and presents the completed hard communication request form including the reservation parameters to the host 107 associated with the listing 411. The host 107 may accept the reservation request, reject the reservation request, or provide a proposed alternative that modifies one or more of the reservation parameters. If the host 107 accepts the hard communication request (or if the guest accepts the proposed alternative), then the hard communication module 215 updates an acceptance/denial flag 439 to indicate that the reservation request was accepted. The guest calendar 417 and listing calendar 465 are also updated to reflect that the listing 411 has been reserved by the guest 101.

The hard communication table 313 stores hard reservation requests made by guests 101, and is one means for performing this function. Each hard reservation request is represented by hard communication object explained in FIG. 4. Hard communication objects 405 are objects including a guest's reservation request for a particular listing (e.g., embodied in a form presented via a GUI, filled out by the potential guest, and stored in database 215), as well as a host response to the reservation request (e.g., either an acceptance or a denial). The reservation request may include a timestamp 431, a hard check-in date 433, a hard reservation duration 435 or check-out date, and a number of guests 437. Because the acceptance of a reservation request by a host 107 is a contractually binding agreement with the guest 101 that the host 107 will provide the listing to the guest 101 at the specified dates, all of the information that the host 107 needs to approve such an agreement are included in a reservation request. A host response to a reservation request is comprised of a binary value indicating acceptance or denial 439 and a timestamp 431.

The timestamp 431 of a hard communication 405 indicates the time at which the communication was submitted to the reservation system 113. The hard check-in date 433 of a hard communication 405 is the first date for which the guest requests a host's listing 411. A check in time may be further specified in a reservation request may be communicated to the host 107 through soft communications 407. The hard reservation duration 435 of a hard communication 405 is the requested duration of the potential guests use of the listed service. Alternatively, the reservation request form may require a reservation check-out date and my further specify a check-out time. Number of guests 437 stipulates the total number of people that may be using the listing.

III.E Soft Communications Module

The soft communication module 207 provides a mechanism for guests 101 and hosts 107 to exchange nonbinding text messages regarding booking listings in the reservation system 113, and is one means for doing so. The soft communication module 207 also records a timestamp associated with each communication and whether the latest soft communication has been responded to by the contacted host.

Soft communication objects 407 are objects generally including at least textual content 443 between a guest 101 and a host 107 that are stored in soft communication table 309. Each soft communication 407 is associated with a guest object 401 and a host object 403. Other than textual content, soft communications generally have no required content, they may not be automatically associated with listings upon authorship. The thread module 211, described below in section III.F, is capable of parsing soft communications to associate them with a thread 409 (also described below), and thus with particular reservation details depending on the textual content. During analysis of the soft communication content 443 the thread module 211 may also tag the soft communication object with soft reservation details such as a soft check-in date 445, a soft reservation duration 447 or soft check-out date, and a soft acceptance or denial 439. If none of the conditions for the above tags have been met the soft communication 407 is a generic communication between the guest 101 and the host 107 and cannot be assigned to a particular thread 409 or listing 411. In addition to the above attributes, soft communications 407 also have a timestamp 431.

The content 443 may include other media as well including pictures or video. The soft check in date 445 of a soft communication object 407 is created by the thread module 211 after textual analysis of the content 443 is complete. For example, textual analysis would detect a soft check-in date 445 for the following textual content 443 of a soft communication 407 by a potential guest 101: "Could I arrive on the night of December $11^{th}$?" The textual analysis process would determine that the soft check-in date 445 for this communication was December $11^{th}$. The soft reservation duration or check-out date 447 of a soft communication 407 is similarly created by the thread module 221. The thread module 211 uses textual analysis of the content 443 of a soft communication to determine the soft reservation duration 447.

For some embodiments, a series of soft communications 407 in succession may be assigned the same soft check-in date 445 or soft reservation duration 447 based on the content 443 of only one of the soft communications 407 in the series. Each of the soft communications 407 do not contain enough context to determine a reservation but because they are likely part of the same conversation it may be assumed that the soft communications 407 refer to the same reservation. Additionally, it is possible to ascertain the soft check in date 445 and the soft reservation duration 447 by analyzing content 443 from consecutive soft communications 407 as each one may not contain all of the necessary information. For example, the following exchange may result in a soft check-in date 445 of December $11^{th}$:

Guest: "Is your room available the week of December $8^{th}$?"

Host: "It should be available on Thursday. Does that work for you?"

Soft acceptances or denials 449 are attributes of a soft communication object 407 that are also determined by the thread module 211. A soft acceptance or denial 449 can only occur in a soft communication from the host 107 to the guest 101. The thread module 221 uses textual analysis to identify questions regarding a reservation in the prior soft communication and then looks for affirmative or negative statements in the next response communication 407 from the host 107 or guest 101 (depending upon who last made a query of the other party). Soft acceptances and denials 449 may then be used by the host standards module 213 to calculate soft suspension metrics. A soft acceptance or denial may also be made to a hard request if, for example, a thread is started by the submission of a hard request and the host responds with a soft communication indicating that the terms of the hard request are acceptable.

III.F Thread Module

The thread module 211 parses hard 405 and soft 407 communications and listings 411 of a host 107 to create a thread 409 between a potential guest 101 and the host 107. The thread module 211 then stores each thread 409 in a thread table 315 within database 215. A thread 409 is record of all types of communications between a potential host 101 and guest 107 pair concerning a single line of inquiry from a single potential guest 101 regarding reserving a listing offered by a single host 107. When a reservation (or booking) is complete, all of the reservation details needed by the host and guest to book the reservation can be found within the communications associated with the thread. The reservation system 113 also uses threads as a basis for assessing host behavior to determine suspension metrics for the host 107.

A thread object 409 is comprised of a number of entries each representing either a soft or hard communication. These entries comprise a communication timeline 451 (i.e. the time between each entry and the next entry is known) associated with a single guest 401 and a single host 403. Multiple threads can exist between the same guest-host pair and so the communication timeline 451 of a thread 409 may be a subset of all communications between the host 107 and the guest 101. Detailed descriptions of the structure and importance of different thread timelines 451 are shown in FIGS. 6-10 and discussed in later sections.

In addition to communication timelines 451, each thread 409 is associated with a particular listing 411 and date range referred to as the associated listing or reservation 453 respectively. The associated listing and reservation 453 are determined by the thread module 211 by processing hard check-in dates 433, hard reservation durations 435, soft check-in dates 445, and soft reservation durations 447, along with timestamps 431 for all communications between a single host 107 and a guest 101. In a process described in more detail in sections IV and V of this document, the thread module 211 determines, which communications can be associated with the same listing and they are collected to form a thread 409. By associating a thread 409 with a listing 411 the thread module 211 can determine the listing outcome 455, which is an indication of the particular guest that actually reserved the listing, whether another guest reserved the listing, or whether the listing was never reserved. The listing outcome 455 may be used in the calculation of some suspension metrics and so is included as an attribute in the thread object 409.

III.G Host Standards Module

The host standards module 213, uses the threads 409 to evaluate host behavior with respect to guests 101. It then determines the appropriate response to correct any unsatisfactory host behavior by incentivizing hosts 107 to improve guest 101 experience. To accomplish this, the host standards module 213 parses the threads 409 to calculate suspension metrics 429 for hosts 403. Suspension metrics 429 may be updated either periodically (e.g. once every 24 hours) or continuously whenever additional data become available. The host standards module 213 stores the suspension metrics 429 in the metric table 317 within database 215.

The host standards module 213 stores the historical data concerning the suspension metrics 429 of each host, along with reviews, historical host scores, previous suspension data, or any other data that data indicative of host behavior that may be correlated with the suspension metrics 429. in the trend data table 319. The host standards module 213 accesses the trend data table to identify trends between undesirable host behaviors and particular suspension metrics 429. Based on the identified trends, the host standards module 213 dynamically adjusts a set of suspension criteria, wherein each criterion may, for example, be a threshold of a suspension metric 429. If all suspension criteria for a suspension are satisfied, the host standards module 213 then indicates suspended hosts by changing the suspension status 427 of the host 403 within the host table 303. This entry, or any other suitable action indicates to the system that the host 107 is prohibited from posting listings 411 for the duration of the suspension. In other embodiments, different penalties may be applied to the host including but not limited to monetary penalties, permission penalties (e.g. the host cannot create additional listings), or a required completion of educational material about how to properly use the reservation system 113. The host standards module 213 is also configured to recommend behavioral changes to hosts 107 under certain suspension conditions. For example, a suspended host might be shown the values of the suspension metrics that resulted in the suspension or might be recommended to change their availability so as to avoid denying too many guests.

IV. Thread Creation

Figure 5A:
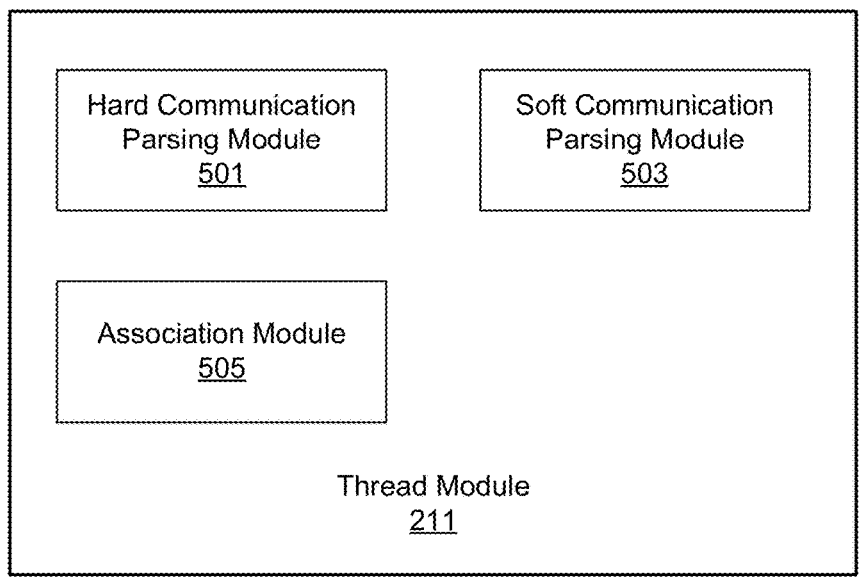
FIG. 5A is a block diagram of the thread module configured to consolidate hard and soft communications into threads in accordance with one embodiment.

As introduced above, the thread module 211 creates threads for use by the reservation system 113, thereby organizing hard and/or soft communications between a guest 101 and a host 107 into a convenient data structure for use in calculating suspension metrics and extracting reservation details. FIG. 5A is a block diagram of the thread module configured to consolidate hard and soft communications into threads in accordance with one embodiment. With reference to FIG. 5A, the thread module 211 is composed of a number of submodules including a hard communication parsing module 501, a soft communication parsing module 503, a listing association module 505. Whenever a thread 409 is created it is assigned a unique thread identifier (thread ID) that is used to create necessary associations between threads 409 and other objects.

The hard communication parsing module 501 is responsible for extracting the database entries from the hard communication table 313 corresponding to hard communications objects 405. The hard communication parsing module 501 extracts all of the attributes of a hard communication object 405 for use as components in a thread 409 and passes them to the thread association module. Examples of the operation of the hard communication parsing module 501 are described in Section V below with respect to FIG. 6.

The soft communication parsing module 503 is responsible for interpreting the database entries from the soft communication table 309 corresponding to soft communication objects 407. The soft communication parsing module 503 uses textual analysis (also referred to as semantic analysis) on the extracted content 443 of the soft communication object 407 and determines, if possible, the soft check-in date 445, the soft reservation duration 447, and any soft acceptances or denials 449 (collectively soft reservation details). If the content 443 of the soft communication 407 is not enough to establish any soft reservation details the soft communication parsing module 503 may infer soft reservation details from temporally adjacent communications between the same guest 101 and host 107. The temporally adjacent communication may include hard communications 405 as well as soft communications 407. It is also possible that the soft communication parsing module 503 can determine some but not all of the soft reservation details. In this case, the thread is associated with the available reservation details and not with an complete listing reservation. Examples of the operation of the soft communication parsing module 503 are described in Section V below with respect to FIG. 6.

The association module 505 receives inputs of the parsed hard and soft communications from the hard 501 and soft 503 communication parsing modules and associates each parsed communication between the same potential guest 101 and host 107 with a listing 411 of the host 107 to create or add to a thread 409 of hard and/or soft communications associated with the same listing and host-guest pair. Communications with sufficiently distinct timestamps 441 are not included in the same thread. For example, if a guest 101 is using an accommodation reservation system and is visiting the same city a second time, the guest 101 may book an accommodation from the same host 107 as when the guest 101 stayed during the previous visit. As a result, the guest may initiate communication with the same host 107 months later. The association module assumes, due to the distinct timestamps 441, that the two series of communications do not relate to the same reservation.

V. Thread Parsing

FIG. 6 illustrates multiple thread timelines that are exemplary of the steps performed by the thread module 211 to determine which communications are associated with which guest-host interactions with respect to a potential reservation. The line labeled "t" indicates the progression of time compared to the events of interest. Communications are indicated by the boxes with upward facing arrows, which indicate their occurrence along the timeline. The dotted lines indicate other relevant events on the timeline. The bars above indicate the reservation association of the thread at the corresponding points in time. The acceptable response interval 609 indicates a period of time that the host has to respond to the guest without negatively affecting one or more of their suspension metrics 429, as is described in section VI.

FIGS. 6A and 6B illustrate simple example threads containing only hard and only soft communications. However, as explained with respect to FIG. 6C-6E, a single thread may be composed of both hard and soft communications. FIG. 6A illustrates a thread comprised of only hard communications 405. In this case only two hard communications have occurred between the host 107 and the potential guest 101. The hard communication module 501 receives and parses both communications and determines that the first communication is a hard reservation request submission 601 and the second communication is a hard request acceptance 603 by the host. Without ambiguity the reservation association module 505 is able to determine the reservation details 611 as they are included in the request submission 601. Therefore, at any point in the history of thread the thread can be associated with reservation details 611.

FIG. 6B illustrates a thread 409 comprised of only soft communications 407. The soft communication parsing module 503 receives communications 613, 615, 617, and 619. After receiving only the first communication, the soft communication parsing module 503 identifies the communication 613 as a communication from the guest 101 to the host 107 but cannot determine any reservation details. Thus, the soft communication parsing module 503 assigns a placeholder associated reservation 621 with no reservation details and initiates a thread at time 605. The soft communication parsing module 503 identifies the second communication 615 as a communication from the host 107 to the guest 101, however no further reservation details are determined. The soft communication parsing module 503 receives the third communication 617 from the guest 101 to the host 101 and determines soft reservation details 623 via textual analysis (i.e. a soft reservation check-in date 433 and a soft reservation duration 435). Because the previous two communications 613 and 615 are associated with the same guest-host pair and are consecutive with communication 617 the associated reservation for communication 613 and 615 are retroactively changed from 621 to 623. The soft communication parsing module 503 receives the final communication and determines, using textual analysis on the content 443 of the soft communication, that the communication is a soft acceptance by the host of the associated reservation 623. When no further communications between the guest 101 and the host 107 the communication timeline 451 ends 607 at the time of receipt of the soft acceptance 619.

Unlike the previous two examples, FIG. 6C illustrates a thread 409 comprised of hard and soft communications. The hard communication parsing module 501 parses communications 601 and the soft communication parsing module parses communications 613, 615, and 619. The first communication between the potential guest 101 and the host 107 is determined to be a hard reservation request submission from the potential guest 101. Communication 601 contains all the necessary reservation details to associate reservation 625 with the thread 409. The soft communication module 503 parses communication 613 and can find no reservation details through textual analysis. However because communication 601 is temporally adjacent the reservation associated with communication 601 is associated with communication 613 and they are added to the same thread 409. The response 615 by the host 107 to communication 613 also contains no reservation details and so is associated with the temporally adjacent communication 613. Lastly, the soft communication parsing module determines through textual analysis that communication 619 is a soft acceptance regarding associated reservation 625 ending 607 the communication timeline 451.

FIG. 6D illustrates a thread 409 comprised of hard and soft communications. The hard communication parsing module 501 parses communications 601 and 619 while the soft communication parsing module 503 parses communications 613 and 615. In this case, the thread starts 605 at the timestamp of communication 613 with the thread module 211 receiving soft communications 613 and 615 and assigning a placeholder associated reservation 627. Shortly after response 615 the hard communication parsing module 501 receives a hard reservation request submission 601 between the same guest-host pair and so the reservation details of the thread 409 are now known from the hard request 601, the thread 409 (including communications 613 and 615) can be associated with reservation 629. The thread ends when the host 107 accepts 603 the hard request submission 610.

FIG. 6E illustrates two threads 409 comprised of hard and soft communications between the same guest-host pair. The thread in FIG. 6E begins as the thread in FIG. 6D, a generic communication 613 and response 615 that are associated with a placeholder reservation 633 are received by the thread module 211. Then a hard request submission 601 is received and provides the reservation details necessary to associate the communications 613, 615, and 601 with reservation 635. A second communication 639 is then parsed by the soft communication parsing module 503, which, upon textual analysis, provides reservation details inconsistent with reservation 635 and so communication 639 is associated with reservation 637 and the thread splits 631 into two separate threads between the same guest-host pair but associated with different reservations. A hard accept 603 is received for the first thread associated with reservation 635 ending 607 the first thread. Subsequently, a soft accept 619 is parsed and associated using textual analysis with the thread associated with reservation 637 ending 607 the second thread. This type of thread splitting may occur at any time or with either a hard or soft source of reservation details (though it is more likely to occur with conflicting hard details).

VI. Suspension Metrics and Issuance

Figure 5B:
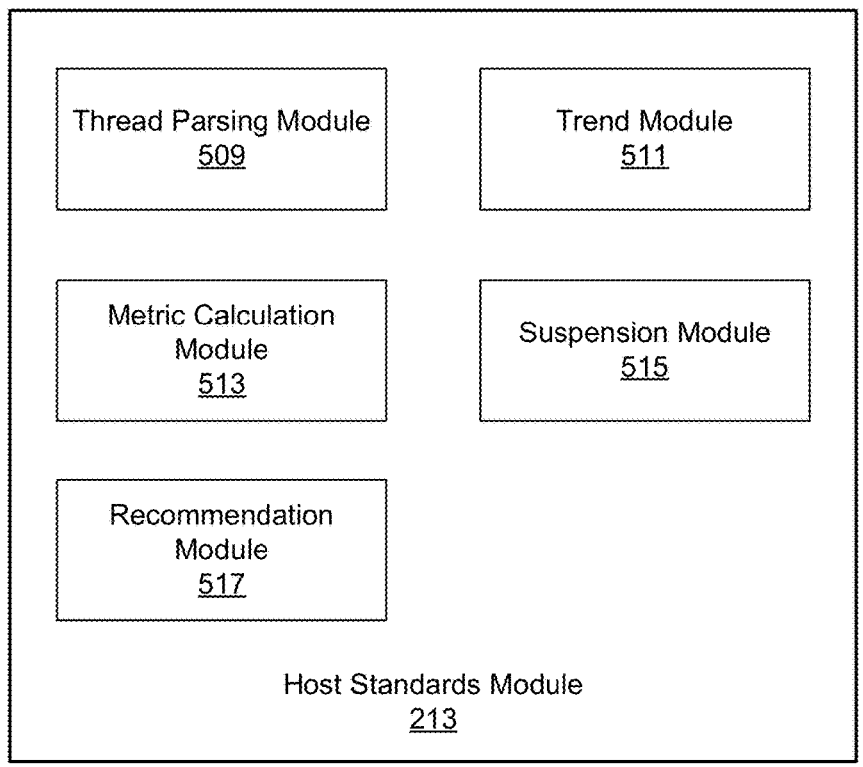
FIG. 5B is a block diagram of the host standards module configured to parse threads, calculate suspension metrics, and suspend hosts in accordance with one embodiment.

FIG. 5B is a block diagram of the host standards module configured to parse threads, calculate suspension metrics, and suspend hosts in accordance with one embodiment. The host standards module 213 is composed of several submodules including a thread parsing module 509, a trend module 511, a metric calculation module 513, a suspension module 515, and a recommendation module 517. The thread parsing module 509 uses the thread objects 409 stored in the thread table 315 to calculate intermediate thread-metrics 457 that contribute to the calculation of suspension metrics. The metric calculation module 513 then aggregates the thread metrics 457 into suspension metrics 429 periodically for each host 403.

The thread parsing module 509 accomplishes the aforementioned function by interpreting data from the thread table 315 and evaluating each thread 409 to calculate thread metrics 457 including number of guest communications, host response time for each guest communication 409, number of non-responses to guest communications, host acceptance or denial, and the completion status 421 for each thread 409. The number of guest communications is determined by counting the number communications sent by the guest 101 in the communications timeline 451. Consecutive communications (within a predetermined time interval are counted as a single communication with a timestamp 441 of the first of the consecutive communications. To determine the host response times in the thread 409, the thread parsing module 509 calculates the difference between the timestamps 441 of each guest communication and each corresponding host response. The thread parsing module 509 determines the number of non-responses by first determining whether the host responded to each guest communication within the acceptable response interval 609. Because a thread 409 can include both hard and soft communication, a response to a hard communication may be a soft communication or vice versa. The thread parsing module 509, may also determine an additional thread metric corresponding to complete non-responses (where the guest does not respond at all) as well as non-responses due to a response after the acceptable response interval 609.

Additionally, the thread parsing module 509 also evaluates whether the reservation request associated with the thread 409 was accepted or denied by the host and whether the host responded within the acceptable response interval 609. Generally, it is undesirable for a host to deny a guest reservation request for a listing if the host 107 allows the date of the listing to pass without accepting another guest 101. However, the thread parsing module 509 checks the thread outcome 455 and checks for denial exceptions, which are exceptions that prevent a denial of a guest reservation request from counting against a host during the calculation of suspension metrics.

The thread parsing module 509 outputs the thread metrics it has calculated to the trend module 511.

The trend module 511 uses statistical relationships between the undesirable host behaviors and the thread data to inform suspension metrics 429 and suspension criteria that may be used to suspend hosts 107 that do not provide a sufficiently positive guest experience with the reservation system 113. The choice of which suspension criteria are used in suspensions, as well as the thresholds used for determining when the suspension criteria has been met may be accomplished by administrative monitoring of data from the trend module 511 or may be accomplished automatically by the reservation system 113. If an embodiment employs the latter method, the trend module 511 may dynamically modify the acceptable response interval 609, the cancellation interval 1003, reservation association parameters, and/or the suspension criteria to incentivize, for example, a particular maximum response time of the host.

The metric calculation module 513 calculates suspension metrics 429 corresponding to each host 107 using the thread metrics from thread parsing module 509. The received information is then used to calculate an acceptance rate, a response rate, a number of consecutive non-responses, an average response time of the host, or the like. This list of suspension metrics 429 is not exhaustive and other descriptive metrics may be a suitable addition to this list if they can be correlated with some aspect of host behavior by the trend module 511. To determine the suspension metrics for a host, the metric calculation module 513 receives all threads 409 associated with a host 107 accessed via the thread table 315 from the thread module 509 along with information identifying labeling threads 409 for non-responses or denials. Additionally, the metric calculation module 513 may also be configured to calculate two sets of metrics one for soft communications and one for hard communications. These sets of metrics may be used to determine major and minor suspensions separately or in combination. In general, to determine suspension metrics 429, the metric calculation module 513 only uses threads 409 that have a positive completion status 421 and where the hard 433 or soft 445 reservation check-in date has already occurred. These conditions ensure that the outcome of the thread 409 is known completely before suspension metrics 429 are calculated. Alternatively, the metrics calculation module 513 may include threads 409 for which the reservation check-in date has not already occurred to calculate non-response related metrics if there are no exceptions for non-responses.

The metric calculation module 513 calculates the consecutive non-responses metric by ordering the threads 409 associated with a host 107 by recency. Then the threads 409 to which the host has not responded within the acceptable response interval 609 or at all can be counted. The resulting count is the consecutive non-response metric for the host 107. The consecutive non-responses metric may be calculated such that the metric calculation module 513 uses only cases where the host 107 does not respond at all (reservation check-in dates 433 or 445 have already passed with no response from the host 107).

The metric calculation module 513 calculates the average response time metric by summing the response times 631 of all threads 409 associated with a host 107 and dividing by the total number of communications between potential guests and the host 107 excluding non-responses. Alternatively, non-responses may be included in the average response time if a response outside of the acceptable response interval 609 exists. Complete non-responses may also be included but must be represented by a sufficiently high predetermined response time value that acts as a penalty.

The metric calculation module 513 calculates the response rate of a host 107 by first determining the total number of communications between potential guests 101 and the host 107 then subtracting the number of non-responses determined by the thread parsing module 509 and dividing by the total number of communications. Separate response rates could be calculated for non-responses where the response occurs but not within the acceptable response interval 609, and for complete non-responses where the host 107 never responds. The metric calculation module 513 may separately calculate a soft response rate and a hard response rate.

The metric calculation module 513 calculates the acceptance rate of a host 107 by counting the number of threads 409 that resulted in an acceptance (hard or soft or both) and divide by the total number of threads. A hard acceptance rate may be calculated separately from a soft acceptance rate for each host. Threads 409 with denials that qualify for an exception (discussed with reference to FIGS. 8-10 in a later section) are not included in the total count.

Suspension module 515 monitors the suspension metrics for each host 107 and determines a host's suspension status 427 based on a set of suspension criteria received from the trend module 511. For example, a host 107 may be suspended if their acceptance rate drops below 80%, or if they have greater than four consecutive non-responses. Alternatively, a compound suspension criteria may exist, for example, a host 107 may be suspended if their acceptance rate is below 70% and their average response time is greater than 18 hours. Suspension criteria used by the suspension module 515 may be any type of logic incorporating any combination of one or more of the suspension metrics, and any threshold minimum or maximum value as provided by the trend module 511 with respect to any included suspension metric. The suspension module 515 may also issue major or minor suspensions based on any combination of suspension metrics 429, corresponding major or minor threshold suspension criteria provided by the trend module 511. For example, a minor suspension may be issued by the suspension module 515 in response to a threshold of a suspension metric that measures short term activity (e.g. a threshold of at least 5 consecutive non-responses). Lapses in shorter term suspension metrics may imply that a host is away from their computer and so could return shortly and resume appropriate behavior, hence a less severe minor suspension may be issued. In contrast, a major suspension may be issued in response to a threshold for longer term suspension metrics that indicate more systematically poor behavior of a host (e.g. a threshold at an 80% response rate or an acceptance rate under 50%).

Furthermore, the suspension module 515 monitors the suspension time remaining for each suspended hosts so that the suspension module 515 may un-suspend a host after a particular suspension time period. Alternatively, the suspension module 515 may monitor the suspended host so that it can detect a set of remedying actions corresponding to the suspension. For example, the suspended host could remedy his or her suspension by responding to all outstanding communications.

The recommendation module 517 creates recommendations for recently suspended hosts 107 to help them improve the guest experience and continue using the reservation system 113 once their suspension is over. Recommendations may be given for any kind of suspension, or alternatively only for a particular type of suspension. The recommendation provided may also be tailored to address the specific suspension metrics that gave rise to the suspension, and may also include the suspension metrics 429 themselves. To do this, the recommendation module 517 requests information pertaining to the suspension of the host 107 If the suspension metrics of a host 107 fit a known behavioral pattern (possibly identified using the trend module 511), the recommendation module 517 may recommend particular changes to a host's behavior. For example, the recommendation may suggest that the host's 107 set of guest filters 425 be changed such that the host 107 may be more likely to accept or respond to potential guests 101. The recommendation module 517 may also recommend changes to a host's listed availability such that they are more likely to be able to respond to guest communications. Finally the recommendation may include a generic message indicating a number of different general recommendations not tied to their suspension metrics for how a host 107 might prevent suspension in the future.

VII. Thread Penalties and Exceptions

FIGS. 7-10 illustrate a variety of communication timelines 451 that exemplify threads that may count against a host as a denial or a non-response, as well as exemplify threads which are excused by denial exceptions. Communications represented in FIGS. 7-10 not labeled explicitly as either soft or hard communications may be either soft or hard communications.

FIG. 7A illustrates a denial within the acceptable response interval 609. The host 107 receives an initial communication 701 from the potential guest 101 and responds within the acceptable response interval 609. This thread 409 would count against the host as a denial. However, because the host responded within the acceptable response period 609 the host is not penalized for a non-response.

FIG. 7B illustrates a response outside of the acceptable response interval 609. The host 107 receives an initial communication 701 but then responds 707 outside of the acceptable response interval 609. Depending on the outcome of the thread 409, the thread may count as an acceptance or a denial but because the response occurs outside of the acceptable response interval 609 it counts against the host 107 as a non-response. The initial communication is associated with reservation 709 and then this reservation is updated as explained in FIG. 6 to associated reservation 711, which continues until the thread 409 is completed.

FIG. 7C illustrates a thread wherein the host 107 fails to respond to a guest communication 701 which is associated with a placeholder reservation 713. Afterwards, the host 107 never responds. Depending on the embodiment, this may count against the host in the same way as in the case of FIG. 7B.

FIG. 8 illustrates a number of cases that exemplify guest booking exceptions. A guest booking exception prevents the host 107 from being penalized in their suspension metrics 429 in the event that at guest books with another host or cancels their reservation. To implement guest booking exceptions, the thread parsing module 509 may access the guest calendar 417 of the guest 401 associated with the thread 409, and remove those threads that have guest booking exceptions from consideration in use in determining thread metrics 457 and in turn preventing the excepted threads from affecting the host's suspension metrics 429.

FIG. 8A illustrates a guest booking with another host before the host 107 responds to a reservation request. The guest initiates the contact with either a hard or soft communication 701, then before the host can respond the guest books with a second host. In this case, the denial 805 of the guest by the host 107 may not count against the host. Because the host 107 responded within the acceptable response interval 609 the host is also not penalized for a non-response.

FIG. 8B illustrates a guest booking with another host before the host 107 responds to a reservation request or soft communication after the acceptable response interval 609 has passed. In this case, the same order of events occurs as in FIG. 8A except at a later time. Because it is possible that the host 107 could have accepted the guest if they had responded with the acceptable response interval 609 the host 107 may, in one implementation, be penalized for the denial of the guest 101. Additionally, because the host 107 did not respond within the acceptable response interval 609 the host 107 may be additionally penalized for a non-response.

FIG. 8C illustrates a guest booking with another host before the host 107 responds to a reservation request or soft communication where the host 107 replies after the acceptable response interval 609 after the guest 101 books with another host before the acceptable response interval 609. The order of events in FIG. 8C is the same as in 8A and 8B but because of the time of the response and the booking the host 107 is not penalized for the denial because it was possible for the host to accept the guest request within the response interval. The host 107 may not be penalized for the non-response because the host has no obligation to respond after being notified that the guest 101 has booked with another host.

FIG. 8D illustrates a case where the host 107 denies 805 the guest 101 before the guest books a different listing 803. In this case, there is not an exception for the denial 805 of the guest 101.

FIG. 9 illustrates a host booking exception, which prevents the host 107 from being penalized for accepting one guest in favor of another for the same listing reservation. For this exception, the thread parsing module 509 accesses the calendar table 311 to determine if the requested listing of the host 107 was reserved by another guest 101. If another guest 101 was able to reserve the listing before the associated reservation date of the thread an exception is made for the denial to the first guest. In FIG. 9, the associated reservation 901 is the same for both threads. Guest 1 requests a reservation 905 only to be denied 907 by the host 107. The host 107 then receives a second request or communication 909 and then accepts 911 the second guest creating an exception for the first denial. By including this exception the reservation system 113 allows hosts 107 to have discretion over which guests 101 they choose to provide reservations.

FIG. 10 illustrates a guest cancellation exception. This occurs whenever the guest 101 cancels without giving the host 107 sufficient notice to find a second guest to fill the listing. The thread parsing module receives a thread containing initial guest communication 701 followed by a host acceptance 1001 however the thread 1001 is extended by a guest cancellation 1005, which, in this case is within the cancellation interval 1003 from the reservation date 903. Because the cancellation 1005 occurred within the guest cancellation interval 1003 and the guest 101 was originally accepted, the acceptance still counts towards the host's acceptance rate.

In addition to the above mentioned exceptions, the host may be given an exception from a denial of a guest 101 that has a particularly poor guest score 413. In one embodiment, the host 107 is required to view the guest's profile before denying the guest for a poor guest score.

VIII. Additional Considerations

FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. In one embodiment, a software module is implemented with a computer program product comprising a persistent computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a persistent computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, an example of which is set forth in the following claims.

What is claimed is:

1. A method comprising:
facilitating communications between guest computers and one or more host computers associated with a host account having access privileges that allow the host account to access a reservation server system, each communication comprising a timestamp;
storing the communications in a communication database;
accessing the communications database to identify a set of communications associated with a guest account and the host account;
creating a thread associated with a single reservation by identifying, from the set of communications, a set of reservation communications that include hard communications, wherein hard communications comprise reservation details sufficient to identify the single reservation;
associating soft communications from the set of communications with the thread based on the timestamps of the soft communications that are within a threshold period of time of the timestamps of the reservation communications, wherein soft communications consist of reservation details insufficient to identify the single reservation;
assigning a thread outcome associated with a result of the single reservation to the thread;
assigning a thread identifier (ID) to the thread;
accessing the communication database to calculate at least one suspension metric for the host account, the suspension metric calculated based on communications associated with the host account that are organized by threads, each with a respective thread outcome and a respective thread ID;
storing the at least one suspension metric in a host database; and
responsive to the at least one suspension metric meeting a threshold suspension condition, revoking at least one of the access privileges of the host account to the reservation server system for a duration of a suspension.

2. The method of claim 1, wherein revoking at least one of the access privileges includes prohibiting the host account from creating additional listings.

3. The method of claim 1, wherein the at least one suspension metric includes calculation of a response rate metric, and wherein calculating the response rate metric comprises:
counting a first number of communications associated with each thread ID;
determining a second number of host responses occurring within a threshold acceptable response interval after each of the communications associated with each thread ID; and
determining the response rate based on a ratio of the first and second numbers for each of the thread IDs.

4. The method of claim 1, wherein the at least one suspension metric includes calculation of an average response time metric, and wherein calculating the average response time metric comprises:
identifying request-response communication pairs where response communications are communications that are responses by the host account to an immediately previous request communications from one of guest accounts, and wherein the request and response communications are associated with the same thread;
calculating a time difference between the timestamps of the response and request communications of the pair; and
calculating an average of the time differences for each of the pairs.

5. The method of claim 1, wherein the at least one suspension metric includes calculation of a consecutive non-responses metric, and wherein calculating the consecutive non-responses metric comprises:
identifying outstanding request communications where outstanding request communications are communications from one of guest accounts to which the host account has not responded within the threshold time period;
identifying request-response communication pairs where response communications are communications that are responses by the host account to an immediately previous request communications from one of guest accounts, and wherein the request and response communications are associate with the same thread;
listing all identified outstanding request communications and request-response communication pairs by timestamp, wherein the timestamp used for the request-response communication pairs is the timestamp of the response; and
counting the number of consecutive outstanding request communications starting from the latest entry in the list.

6. The method of claim 1, wherein the at least one suspension metric includes calculation of an acceptance rate, and wherein calculating the acceptance rate of the host account comprises:
identifying all threads associated with the host account by accessing a list of thread IDs stored in a host profile;
counting a number of identified threads;
counting a number of hard acceptances, wherein a hard acceptance is a binding response by the host account to a request by a potential guest reserving a requested listing; and
calculating a ratio of the number of hard acceptances to the number of identified threads.

7. The method of claim 1, wherein the at least one suspension metric includes calculation of an acceptance rate, and wherein calculating the acceptance rate of the host comprises:
identifying all threads associated with the host account by accessing a list of thread IDs stored in a host table;
counting a number of identified threads;
counting a number of soft acceptances, wherein a soft acceptance is a non-binding response by the host account to a request of a listing; and
calculating a ratio of the number of soft acceptances to the number of identified threads.

8. The method of claim 7, wherein calculating the acceptance rate of the host account further comprises:
accessing a calendar store corresponding to the host account, wherein the calendar store is comprised of entries, an entry corresponding to a combination of a listing and a reservation time in the past, wherein the entry indicates whether the reservation time was reserved by a guest, left vacant during an available reservation time, or marked unavailable by the host account associated with the listing;
identifying, using the calendar store corresponding to the host account, all threads associated with a first guest and associated with a listing and a reservation time that was reserved by a another guest or marked unavailable by the host; and
identifying all threads associated with the host account excluding those threads identified using the calendar store corresponding to the host account.

9. The method of claim 7, wherein calculating the acceptance rate of the host account further comprises:
accessing a calendar store corresponding to a guest having at least one thread with the host account, wherein the calendar store is comprised of entries, the entries corresponding to a reservation time and the guest's reserved listing at that reservation time;
identifying, using the calendar store corresponding the guest, all threads associated with the guest and the host account and associated with a listing of the host account and a reservation time, during which the guest reserved with a listing with a different host account; and
identifying all threads associated with the host account excluding those threads identified using the calendar store corresponding to each guest.

10. The method of claim 7, wherein calculating the acceptance rate of the host account further comprises:

receiving a reservation cancelation from a guest within a cancellation interval of the guest's reservation check-in time, identifying all threads associated with the guest from which the cancelation was received and associated with a listing of the host account and a reservation time; and identifying all threads associated with the host account excluding those threads identified based on receiving the cancelation from the guest.

11. The method of claim 1,
wherein calculating the at least one suspension metric further comprises, calculating the at least one suspension metric using only those thread IDs comprising at least one communication that is a hard request specifying a reservation check-in date more than a predetermined time period before a current time.

12. The method of claim 1, wherein
the thread outcome is one from the group consisting of a hard acceptance, a hard denial, a soft acceptance, a soft denial, a hard non-response, and a soft non-response.

13. The method of claim 1, further comprising:
receiving a selection of guest filters from a host account, wherein the filters are criteria required to be satisfied by a potential guest before the guest account is allowed to communicate with the host account; and responsive to suspending the host account, issuing recommendations to the host account suggesting changes to the guest filters.

14. The method of claim 1, wherein associating the soft communications with the thread further comprises retroactively associating with the thread soft communications occurred before the reservation communications and within the threshold period of time.

15. The method of claim 1, further comprising associating soft communications not being associated with a reservation with a placeholder, and responsive to identifying the set of reservation communications within the threshold period of time, replacing the placeholder with an association of the thread.

16. A computer system comprising:
a processor; and
a memory storing instructions that, when executed by the processor, cause the processor to:
facilitate communications between guest computers and one or more host computers associated with a host account having access privileges that allow the host account to access a reservation server system, each communication comprising a timestamp;
store the communications in a communication database;
access the communications database to identify a set of communications associated with a guest account and the host account;
create a thread associated with a single reservation by identifying, from the set of communications a set of reservation communications that include hard communications, wherein hard communications comprise reservation details sufficient to identify the single reservation;
associate soft communications from the set of communications with the thread based on the timestamps of the soft communications that are within a threshold period of time of the timestamps of the reservation communications, wherein soft communications consist of reservation details insufficient to identify the single reservation;
assign a thread outcome associated with a result of the single reservation to the thread;
assign a thread identifier (ID) to the thread;
access the communication database to calculate at least one suspension metric for the host account, the suspension metric calculated based on communications associated with the host account that are organized by threads, each with a respective thread outcome and a respective thread ID;
store the at least one suspension metrics in a host database; and
responsive to the at least one suspension metric meeting a threshold suspension condition, revoking at least one of the access privileges of the host account to the reservation server system for a duration of a suspension.

17. The computer system of claim 16, wherein the processor is further configured to denote the host account as hard suspended, wherein a hard suspension occurs in response to thread based statistics resulting from hard denials and hard non-responses.

18. The computer system of claim 16, wherein the processor is further configured to denote the host account as soft suspended, wherein a soft suspension occurs in response to thread based statistics resulting from soft denials and soft non-responses.

19. The computer system of claim 16, wherein associating the soft communications with the thread further comprises retroactively associating with the thread soft communications occurred before the reservation communications and within the threshold period of time.

20. The computer system of claim 16, wherein the processor is further configured to associate soft communications not being associated with a reservation with a placeholder, and responsive to identifying the set of reservation communications within the threshold period of time, replacing the placeholder with an association of the thread.

* * * * *